United States Patent
Howes et al.

(10) Patent No.: US 10,341,047 B2
(45) Date of Patent: Jul. 2, 2019

(54) METHOD AND SYSTEM FOR CONTROLLING THE FORWARDING OF ERROR CORRECTION DATA

(71) Applicant: Hewlett Packard Enterprise Development LP, Houston, TX (US)

(72) Inventors: Richard A. Howes, Los Angeles, CA (US); William M. Leblanc, Santa Cruz, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1242 days.

(21) Appl. No.: 14/069,360

(22) Filed: Oct. 31, 2013

(65) Prior Publication Data

US 2018/0006764 A1 Jan. 4, 2018

(51) Int. Cl.
| | |
|---|---|
| *H04L 1/00* | (2006.01) |
| *H04L 29/06* | (2006.01) |
| *H04L 29/08* | (2006.01) |
| *H04L 12/26* | (2006.01) |

(52) U.S. Cl.
CPC ........ *H04L 1/0041* (2013.01); *H04L 65/4084* (2013.01); *H04L 65/605* (2013.01); *H04L 65/608* (2013.01); *H04L 65/80* (2013.01); *H04L 69/321* (2013.01); *H04L 69/324* (2013.01); *H04L 43/0847* (2013.01); *H04L 43/16* (2013.01)

(58) Field of Classification Search
CPC ..... H04L 1/0041; H04L 69/324; H04L 43/16; H04L 65/608
See application file for complete search history.

(56) References Cited

U.S. PATENT DOCUMENTS

| | | | | |
|---|---|---|---|---|
| 6,940,903 | B2* | 9/2005 | Zhao | H03M 7/30 348/E5.067 |
| 7,518,524 | B1 | 4/2009 | Aiello et al. | |
| 7,617,436 | B2* | 11/2009 | Wenger | H04N 19/147 714/758 |
| 8,041,051 | B2* | 10/2011 | Pilati | H04L 1/004 379/353 |

(Continued)

OTHER PUBLICATIONS

Howes, R. et al.; "Final Office Action issued in U.S. Appl. No. 14/169,026"; dated Mar. 18, 2016; 22 page.

(Continued)

*Primary Examiner* — Esaw T Abraham
(74) *Attorney, Agent, or Firm* — Hewlett Packard Enterprise Patent Department

(57) ABSTRACT

According to one embodiment, a system is described that comprises a network device adapted to receive a media stream that includes a plurality of packets. The network device of the system processes the media stream, targeted for a client device that is communicatively coupled to the network device, by perform a number of operations. A first operation includes analyzing a packet type for each packet of the plurality of packets and detecting an event causing difficulty for the client device to successfully receive the media stream. Based on both detecting the event and analyzing the packet type for each packet of the plurality of packets, the network device only transmits a portion of the media stream to the client device, where the portion of the media stream is the received media stream absent one or more packets of the plurality of packets.

20 Claims, 5 Drawing Sheets

(56) References Cited

U.S. PATENT DOCUMENTS

| | | | |
|---|---|---|---|
| 8,091,011 B2 * | 1/2012 | Rajakarunanayake | ................... H04L 1/0009 714/47.1 |
| 8,194,878 B2 * | 6/2012 | Pilati | ............ H04L 1/004 379/353 |
| 8,363,548 B1 | 1/2013 | Aboul-Magd et al. | |
| 8,713,396 B2 * | 4/2014 | Utagawa | ............ G06F 11/006 714/750 |
| 8,964,921 B2 * | 2/2015 | Kure | ............ H04N 21/44004 375/355 |
| 9,166,735 B2 * | 10/2015 | Vafin | ............ H04L 1/0009 |
| 2004/0120345 A1 | 6/2004 | Yamaguchi et al. | |
| 2004/0131013 A1 | 7/2004 | Ise et al. | |
| 2005/0018607 A1 | 1/2005 | Frouin | |
| 2006/0187840 A1 | 8/2006 | Cuffaro et al. | |
| 2006/0209807 A1 | 9/2006 | Lor et al. | |
| 2007/0025264 A1 | 2/2007 | Cheng et al. | |
| 2008/0025318 A1 | 1/2008 | Knazik et al. | |
| 2008/0123660 A1 | 5/2008 | Sammour et al. | |
| 2013/0239150 A1 | 9/2013 | Chen et al. | |

OTHER PUBLICATIONS

Howes, R., et al.; "Non-final Office Action issued in U.S. Appl. No. 14/169,026"; dated Aug. 14, 2015; 25 pages.

* cited by examiner

METHOD AND SYSTEM FOR CONTROLLING THE FORWARDING OF ERROR CORRECTION DATA

CROSS-REFERENCE TO RELATED APPLICATIONS

This application claims the benefit of priority on U.S. Provisional Application No. 61/724,794, filed on Nov. 9, 2012, the entire content of which is incorporated by reference herein.

FIELD

Embodiments of the disclosure relate to the field of communications, and in particular, to a system, network device and method directed to prioritizing wireless packets forming a media stream and reducing overhead through controlled insertion or removal of Forward Error Correction (FEC) data.

GENERAL BACKGROUND

Real-time Transport Protocol (RTP) defines a standardized packet format for delivering streaming media, such as audio and video streams, over Internet Protocol (IP) networks. RTP is used in conjunction with the RTP Control Protocol (RTCP), where RTP handles the media streams (e.g., audio and video) while RTCP handles quality of service (QoS) monitoring as well as the synchronization of multiple media streams.

BRIEF DESCRIPTION OF THE DRAWINGS

The following description and accompanying drawings are used to illustrate embodiments of the disclosure.

DETAILED DESCRIPTION

Figure 1:
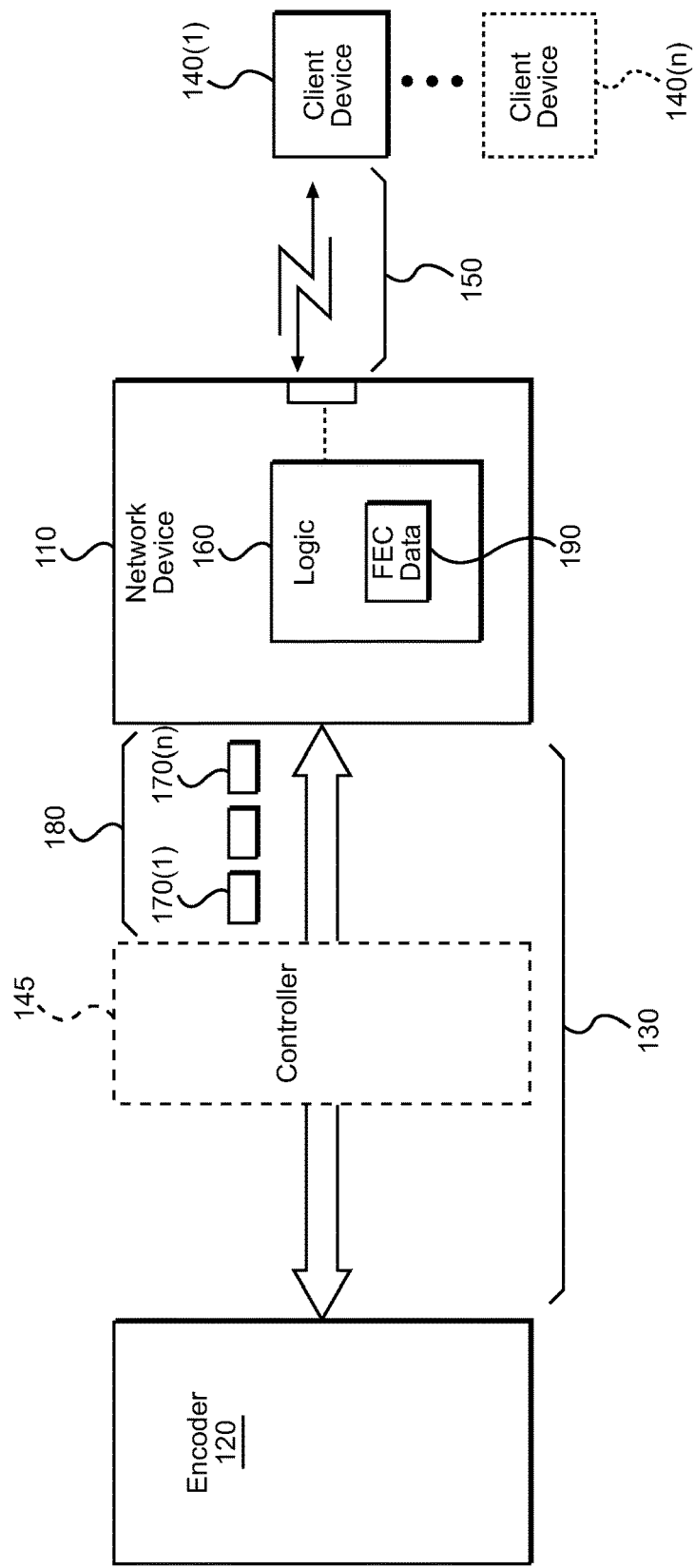
FIG. 1 is an example of a network utilizing at least one of a packet prioritization scheme and an error correction control scheme in accordance with one or more embodiments.

Embodiments of the disclosure are directed to a system, network device and method for packet-based prioritization of media streams, forward error correction (FEC) insertion and removal from communications with one or more targeted client devices, and packet modification based on packet type and/or priority.

According to one embodiment of the disclosure, packet-based prioritization involves examination of packets within a media stream to determine packet payload type (packet type) and at least applying quality of service (QoS) settings for each packet accordingly. As an illustrative embodiment, packets forming a media stream are examined to determine their types (e.g., video, audio, I-frame, B-frame, P-frame, etc.). The identified packets may be assigned a priority level from a set of priority levels based on packet type. As a result, priority for data within a media stream may be assigned on a per-packet basis instead of or in addition to a "per session" or "per stream" basis.

In an embodiment, the network device may be configured to control the transmission of Forward Error Correction (FEC) data. In an example, the network device generates FEC data for a set of packets (e.g., corresponding to an I-frame) being transmitted to a client device and transmitting the FEC data to the client device if the client device fails to receive a particular packet in the set of packets. In another example, the network device receives a set of packets with FEC data from another device for forwarding onto a client device. The network device forwards the set of packets without the FEC data and effectively, reduces congestion or wireless channel usage when data is being wirelessly transmitted. The network device may retain the FEC data (that was not forwarded with the set of packets) and forward the FEC data if and when a client device reports loss of a packet in the set of packets.

In an embodiment, the network device determines that a portion of the data intended to be forwarded to a client device (a) cannot be decoded or (b) is not useful and based on this determination drops that portion of the data without transmission to the client device. In an example, a network device streams video comprising I-frames, B-frames, and P-frames to a client device. Each of the B-frames and P-frames refers to information contained within preceding reference frames (I-frames or P-frames). The decoding process of these B-frames and P-frames relies on the proper reception of the preceding reference frame. A network device determines that a client device is not able to decode packets in a reference frame due to packet loss (or any other type of error). In response, the network device drops the remaining packets of that frame and/or drops the following B-frames and P-frames. Dropping the packets is advantageous because the client device cannot decode and/or properly process the B-frames and P-frames without the preceding reference frame, channel air time is saved, and packet traffic congestion is reduced. The network device resumes transmission of the stream with the next I-frame and the following B-frames and P-frames.

Additionally, the network device may be configured to perform packet modification based on packet type and/or priority (e.g., dropping packets based on priority; increase/decrease power level for certain types of packets; increase/decrease retransmit attempts for certain types of packets; etc.).

Herein, certain terminology is used to describe features of the disclosure. For example, the term "network device" generally represents electronics that support the receipt and/or transmission of wireless and/or wired communications including, but not limited or restricted to a controller; an access point (AP); a base station; a data transfer device (e.g., switch, router, bridge, brouter, etc.); consumer electronics with wireless connectivity that may feature additional packet management functionality such as a television, a set-top box, a digital video recorder (DVR), a video gaming console, a projector, cellular phone supporting wireless (non-cellular) connectivity, and/or a television peripheral such as Apple® TV; or the like.

It is contemplated that the network device may include logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" and "component" are generally defined as hardware and/or software. For example, as hardware, logic may include processing circuitry (e.g., a microcontroller, any type of processor, a programmable gate array, an application specific integrated circuit, etc.), semiconductor memory, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission media (e.g., electrical, optical, acoustical or other form of propagated signals such as carrier waves, infrared signals, or digital signals).

An "interconnect" is generally defined as a communication pathway established over an information-carrying medium. This information-carrying medium may be a physical medium (e.g., electrical wire, optical fiber, cable, bus traces, etc.), a wireless medium (e.g., air in combination with wireless signaling technology) or a combination thereof. The data transferred over the interconnect may be in accordance with a variety of communication protocols including, but not limited or restricted to those protocols in accordance with WIFi™, various IEEE 802.11 standards (e.g., IEEE 802.11ac, 802.11n, etc.), or the like.

The terms "message," "packet" and/or "frame" denote a grouping of data, namely a series of bits having a prescribed format.

The term "I-frame" (Intra-coded frame) is generally defined as a fully specified video frame that can be decoded in and of itself, and used as a reference frame by B-frames, P-frames, and other types of frames. B-frames and P-frames are used by the encoder in an attempt to limit the amount of redundant information transmitted. For example, in a scene where an airplane flies across a horizon in the background, only the airplane's movements needs to be encoded. The encoder does not need to transmit the background pixels, thus saving space. A "P-frame" (predictive frame) can refer to reference frames from previous sampled times, and can also serve as a reference frame. A B-frame (bi-predictive frame) can refer to reference frames from both previous and future sampled times, but cannot serve as a reference frame.

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations are not set forth in detail in order to avoid unnecessarily obscuring this description.

I. Network Architecture

Referring to FIG. 1, an example embodiment of a network 100 supporting packet prioritization, FEC control, and/or packet modification is shown. Herein, network 100 comprises a network device 110 that is adapted to receive messages from an encoder 120 over a first communication path 130 and to forward such messages to other network device(s), such as client devices $140_1$-$140_N$ (where N≥1) over a second communication path 150. It is contemplated that, as an optional embodiment, a controller 145 is positioned along first communication path 130 between encoder 120 and network device 110.

Herein, network device 110 comprises logic 160 that is configured to examine incoming packets $170_1$-$170_M$ (M≥2) forming a media stream 180, determine the type of each packet $170_1$-$170_M$, and apply an appropriate QoS setting for each packet $170_1$-$170_M$ within media stream 180.

Furthermore, network device 110 includes logic 160 that is configured to generate FEC data 190 as packets $170_1$-$170_M$ flow through network device 110. For instance, FEC data 190 may be generated by performing an Exclusive OR (XOR) on data within packets $170_1$-$170_M$ formulating media stream 180. Network device 110 continues to generate FEC data 190 and, upon receipt of signaling that identifies a decode error, dropped packet error, or other error for one of packets $170_1$-$170_M$ from a client device (e.g., client device $140_1$), network device 110 is configured to transmit FEC data 190 to client device $140_1$.

Similarly, FEC data 190 provided by encoder 120 (or other transmitting device) may be removed by network device 110 or another intermediary device along first communication path 130 in order to optimize airtime and avoid unnecessary wireless traffic from network device 110. The FEC data 190 may be retained by network device 110 for transmission upon receiving an indication of transmittal error.

Figure 2:
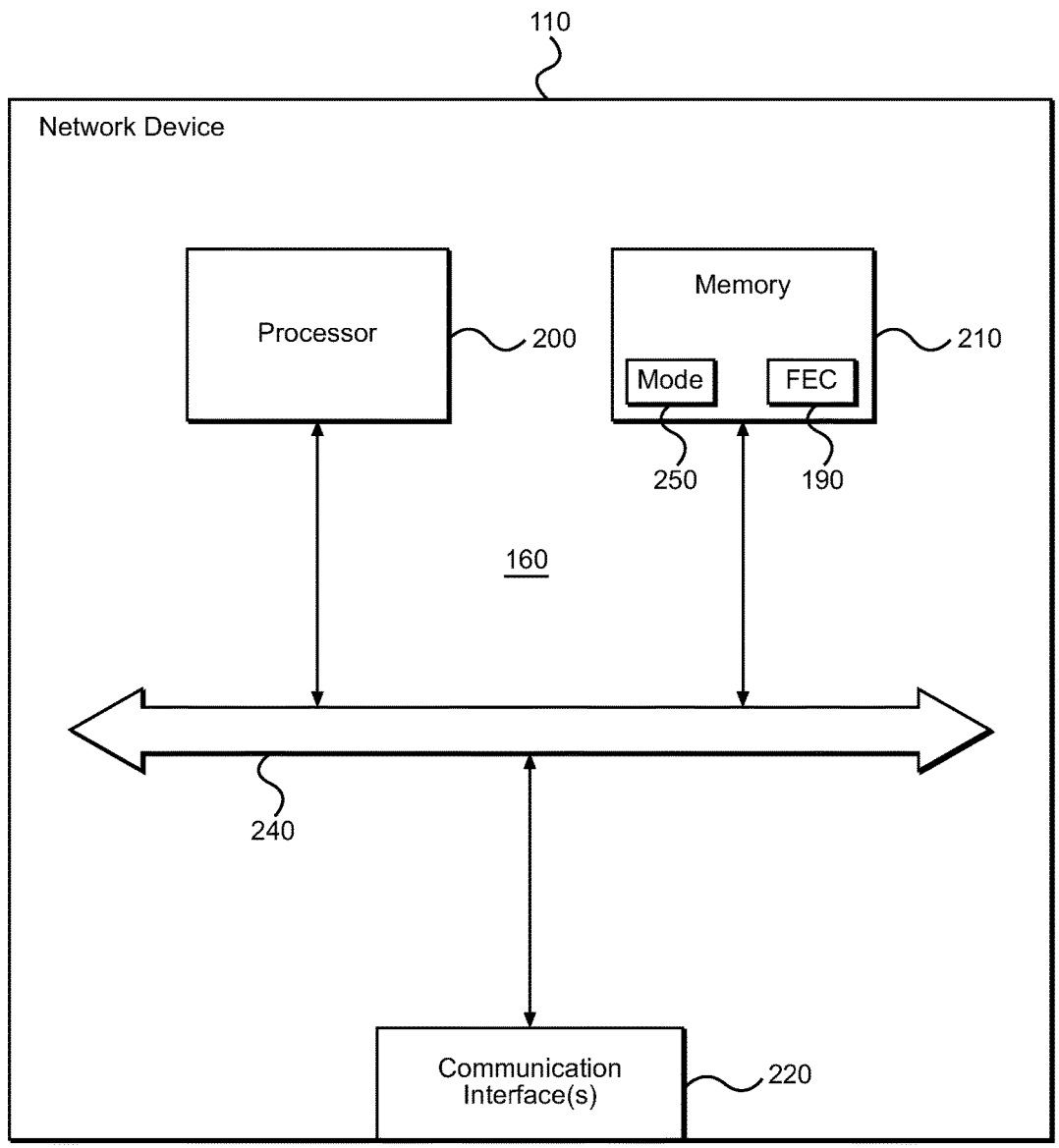
FIG. 2 is an example of a network device implemented with logic supporting a packet prioritization scheme and/or an error correction control scheme in accordance with one or more embodiments.

Referring now to FIG. 2, an example embodiment of network device 110 operating in combination with encoder 120 is shown. In accordance with one embodiment of the disclosure, logic 160 within network device 110 comprises a processing circuitry 200, a memory 210 and/or a communication interface 220 that is adapted to communicate with other devices supporting wired and/or wireless connectivity. These logic units are coupled together by an interconnect 240. As shown, communication interface 220 may comprise a wired port and/or one or more radios, tuners, and/or antenna(s) that support wireless communications.

According to one embodiment of the disclosure, memory 210 may be a type of non-volatile memory that is adapted to store FEC data 190 generated upon receipt of one or more corresponding media streams from encoder 120 of FIG. 1. Memory 210 may further be used to store software modules 250 that are responsible for performing packet prioritization, FEC control, and/or packet modification different as described below.

II. Packet Prioritization

Figure 3:
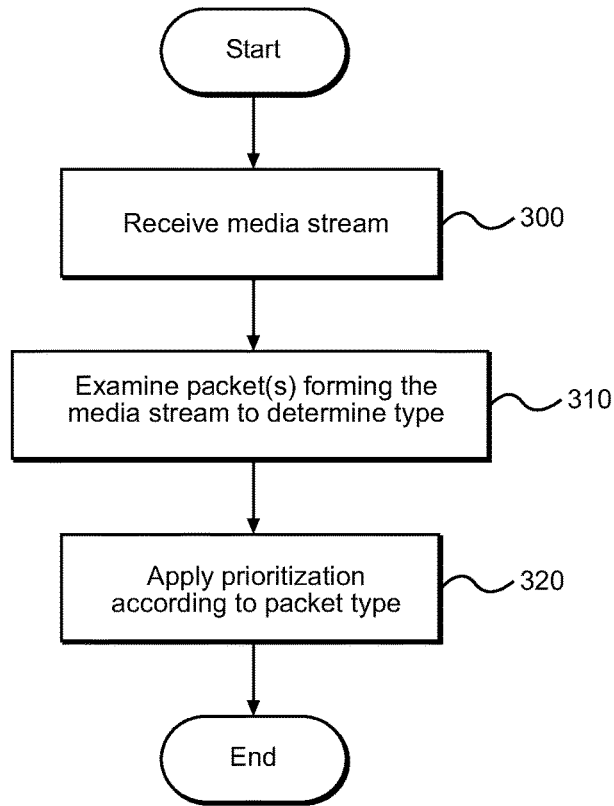
FIG. 3 is an example of a flowchart illustrating a packet prioritization scheme in accordance with one or more embodiments.

As shown in FIG. 3, an example embodiment describing packet prioritization performed by network device 110 of FIG. 1 is shown. Herein, a RTP-based media stream is received (block 300). According to one embodiment of the disclosure, one or more packets forming the media stream are examined in order to determine their particular packet type(s) (block 310). Based on the determined packet type, time to send, and previous state of the stream, different prioritization schemes may be applied to these packets (block 320).

Figure 4:
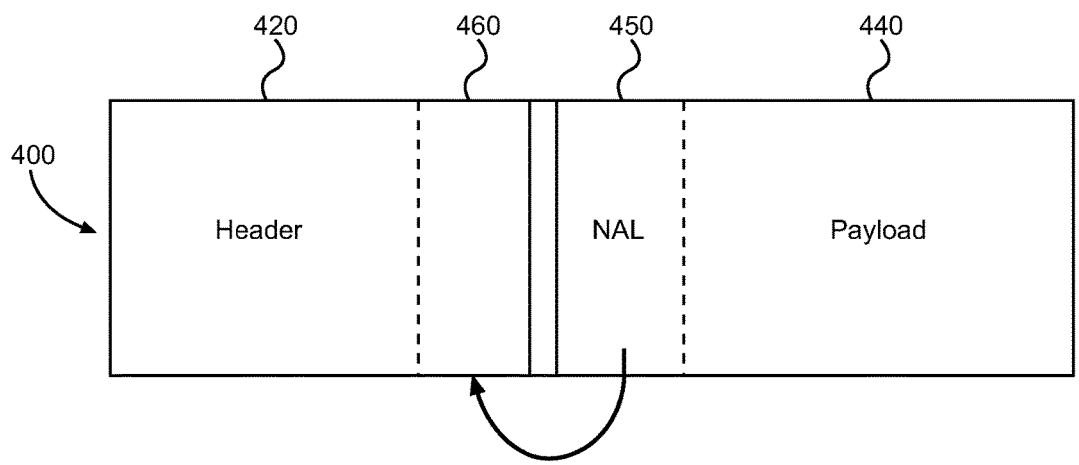
FIG. 4 is an example of a RTP packet payload scheme in accordance with one or more embodiments.

In an embodiment, different quality-of-service (QoS) settings may be applied based on the particular packet type detected. In an example, referring to FIG. 4, network device 110 comprises logic 160 that analyzes information within a non-encrypted portion of a Secure Real-time Transfer Protocol (SRTP) based message 400. The SRTP-based message 400 comprises a non-encrypted header 420 and an encrypted payload 440. A first portion of the encrypted payload 440 may include "Network Abstraction Layer" (NAL) data 450 which identifies the type of message.

In an embodiment, the NAL data 450 is placed within an extension header 460 within header 420. The content of NAL data 450 is sufficient for network device 110 to discover the packet type (for example, packet for an I-frame, B-frame, P-frame or FEC). This information is useful because, if wireless traffic becomes congested, the system may selectively drop packets. In an example, network device 110 transmits all I-frame and drops other frames with other types (e.g., P-frame or B-frame) in order to optimize system performance. In another example, network device 110 reduces congestion by dropping one I-frame and all associated B-frames and P-frames so that other I-frames, B-frames, and P-frames may be successfully transmitted and received by the client device.

In another example, audio packets may be set to a first priority level (e.g. audio level) while video packets may be set to a second priority level that is lower than the first priority level. Alternatively, besides QoS settings, other prioritization schemes may be deployed such as priority based deletion.

In an embodiment, priority may be applied on a per packet basis using packet type information (or other information). Applying priority on a per packet basis may be advantageous over applying priority on a per session or per stream basis. Applying priority on a per packet basis may be used to reduce congestion (e.g., via selective packet drops) and/or transmit information that is most useful to a client device (e.g., dropping packets that cannot be decoded or processed in a useful manner).

III. FEC Data Insertion

Figure 5:
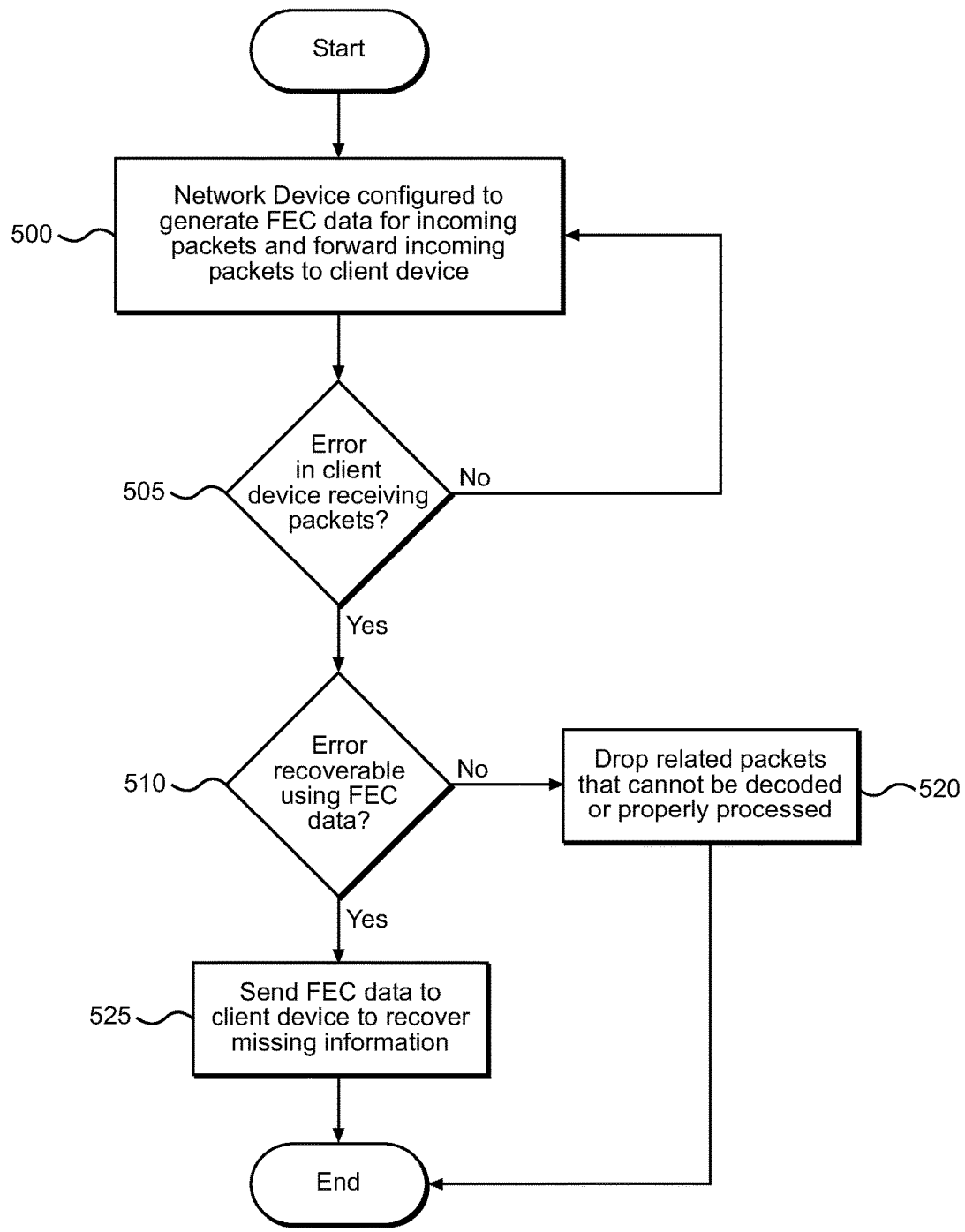
FIGS. 5 and 6 are examples of flowcharts illustrating error correction control schemes in accordance with one or more embodiments.

Referring to FIG. 5, an example embodiment of a flowchart illustrating a first forward error correction (FEC) control scheme utilized by network device 110 of FIG. 1 is shown. Network device 110 is configured to generate FEC data for incoming packets and selectively insert the FEC data for forward the incoming packets to a client device (operation 500). If there is an error in the client device receiving packets (operation 505), the network device determines whether the error is recoverable using the FEC data (operation 510). In an example, when one packet in a frame is dropped in the transmission from the network device 110 to the client device, the information for the packet may be computed using the FEC data. If in a single FEC packet scheme, multiple packets in a frame are dropped in the transmission from the network device 110 to the client device, the information for the multiple packets cannot be determined using the FEC data and as a result the frame cannot be decoded. Based on the determination that the frame cannot be decoded, the network device drops any remaining packets for the same frame and/or any packets for related frames that cannot be decoded or properly processed (operation 520).

If the error is recoverable using the FEC data, then the network device 110 transmits the FEC data to the client device. In an example, the client device decodes the frame using the received packets and the FEC data. The FEC data enables the client device to deduce the dropped packet and to decode the frame without requiring the client device to re-sync with the network device for re-transmission of the frame, or even worse, re-sync with the encoder.

As an illustrative example, a network device (e.g. an access point) receives one or more I-frames being part of a media stream. The I-frame comprises six User Datagram Protocol (UDP) packets. In the event that one of these UDP packets gets dropped and there is no error correction, the entire frame may not be decoded. The loss of an I-frame can impact a significant amount of video (e.g., half of a second of video) and in addition the transmission of the remaining UDP packets wastes wireless bandwidth.

One advantage in transmitting FEC data only in response to a decode error is that this scheme avoids transmission of unnecessary FEC data, which may add, for example, 15% to the size of the transmitted media stream.

IV. FEC Packet Removal

Figure 6:
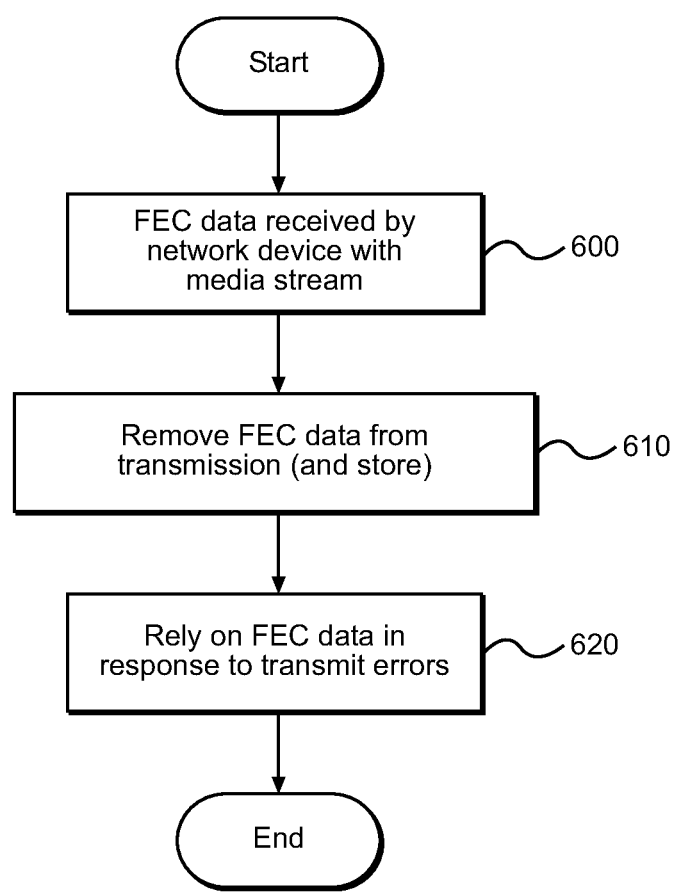

Referring to FIG. 6, an example embodiment of a flowchart illustrating a second error correction control scheme is shown. Herein, FEC data for one or more frames is being generated along the first communication path and received by network device (block 600). The network device is configured to remove the FEC data from transmissions over the second communication path. In particular, the network device is configured to reduce wireless traffic in communications with one or more client devices by removing FEC data (block 610) from transmissions, relying on FEC insertion to handle specific errors (block 620).

In an example, initial wireless communications between the network device and targeted client device(s) are operating correctly. Thereafter, in response to packet loss errors, the encoder through RTP is advised of the errors. As a result, the encoder begins to generate and send FEC data for every frame transmitted to the network device for forwarding to the client device. If the network device forwards the frame with the FEC data, the network is further congested exacerbating a rate of dropped packets. In order to minimize traffic congestion, network device removes the FEC data before forwarding the data, received from the encoder, to the client device. The FEC data may be stored in memory at the network device for later access during the RTP session as needed. In an embodiment, FEC data is removed in response to a certain triggering event such as the second communication path exceeding a certain amount of traffic congestion, the lack of a decode error for a prescribed period of time, or the like.

V. Packet Modification

Upon supporting packet-based QoS, the network device is aware of the type of video data (e.g., I-frames, B-frames, P-frames or FEC) being forwarded to one or more client devices at a particular moment. This enables the network device to perform prioritized dropping and transmission, where specific messages within a media stream transmission are intentionally dropped to optimize system performance, especially where wireless bandwidth constraints are being approached and decode errors are increasing.

Furthermore, as the network device is aware of packet types being forwarded, it is contemplated that various operations may be performed to improve the chances of successful reception and decode of certain packets (e.g., increase power level on a per packet basis, reduce re-transmit time) or reduce wireless traffic (e.g. increase re-transmit time).

VI. Dynamic Modification of Video Quality for Client Device(s)

It is contemplated that, to further improve media stream delivery, one or more network devices, individually or collectively, may be configured to dynamically modify the quality of video displayed at one or more targeted client devices based on analyzed performance. As video normally features a base video layer providing a first level visual experience (resolution, fidelity, frame rate, etc.) overlaid by zero or more upper video layers that (with the base video layer) provides enhancement, the quality of the displayed video may be modified by dynamically removing one or more upper video layers before transmission to the targeted client device(s) and/or dropping frames (or packets) associated with particular upper video layer(s).

According to one embodiment of the disclosure, this scalable video functionality may be accomplished by logic (e.g., an application with a software component or application) implemented within one or more network devices. One example of a software component that is configured for performing the functionality described herein is a scalable Media Aware Network Element (MANE). By implementing the scalable video MANE within the network device(s), current disadvantages associated with conventional systems are mitigated. For instance, by placing such functionality at the network device (e.g. AP and/or controller in communication with the AP), video scaling is performed more accurately because video resolution levels may be reduced and increased more promptly in response to detected network/client device performance issues and the correction of such issues.

According to this embodiment of the disclosure, the network device(s) may be configured to analyze performance based on one or more measured network parameters such as (a) transmit errors realized by the client device(s), (b) signal strength measured at the client device(s), and/or (c) data traffic load at the network device(s). It is contemplated that other parameters may be used for this analysis as well. Furthermore, it is contemplated that video data targeted for unicast, multicast or broadcast transmissions may be scaled based on analysis of these network parameters.

As an illustrative embodiment, a video source outputs high-resolution video data to an access point using a software component within an application (e.g., scalable video MANE) that scales resolution. The high-resolution video data is targeted for a wireless client device (e.g., a dual-phone telephone, a portable computer with wireless connectivity, etc.) that is associated with the access point. The high-resolution video data comprises a base video layer and a plurality of upper video layers.

In the event that the access point (or a controller in communication with the access point) determines that the client device is unable to successfully receive the high-resolution video data (e.g., caused by movement of the client device, interference with the radio signal, packet traffic congestion, buffer overload, etc.), the software component (e.g., the scalable video MANE) within the access point (and/or controller) may be configured to remove certain frames or packets from one or more video layers and/or remove one or more upper video layers. As a result of removing certain frames or packets prior to transmission to the client device, the client device is receiving and rendering lower resolution video.

The access point may resume transmitting all packets for high-resolution video when the access point (or controller) determines that the client device is able to successfully receive the high-resolution video, subsequent to a period of time, or in response to another event. For instance, the client device may move from its current location to another location with better wireless reception (or less restricted access controls that allow higher video resolutions) or the congestion within the wireless network may subside. At that time, the software component within the access point ceases removal of certain frames and/or upper video layer(s) so that the client device receives and renders the high-resolution video data.

Additional advantages and modifications will be clear to those skilled in the art. Embodiments are not limited to the specific details and representative examples shown and described herein. Various modifications may be made without departing from the spirit or scope of the embodiments as determined by the subsequently filed claims and their equivalents. The descriptions are thus to be regarded as illustrative instead of limiting.

What is claimed is:

1. A non-transitory computer readable medium comprising instructions which, when executed by one or more hardware processors, causes performance of operations comprising:
   transmitting, by a particular network device, a plurality of packets without Forward Error Correction (FEC) data corresponding to the plurality of packets, the FEC data comprising information to estimate information for at least one packet in the plurality of packets using packets, other than the at least one packet, in the plurality of packets;
   determining that the at least one packet in the plurality of packets did not reach a target device;
   responsive to determining that the at least one packet did not reach the target device, transmitting the FEC data to the target device.

2. The medium of claim 1, wherein the operations further comprise: prior to the transmitting the plurality of packets:
   receiving, by the particular network device, a dataset comprising both (a) the plurality of packets and (b) the FEC data corresponding to the plurality of packets; and
   identifying, by the particular network device, the plurality of packets from the dataset for transmission to the target device without the FEC data.

3. The medium of claim 1, wherein the operations further comprising:
   generating, by the particular network device, the FEC data from the plurality of packets.

4. The medium of claim 1, wherein the operations further comprising:
   generating, by the particular network device, the FEC data from the plurality of packets by performing an Exclusive Or (XOR) on data within the plurality of packets.

5. The medium of claim 1, wherein the operations further comprise:
   determining that the FEC data is sufficient to estimate the information for the at least one packet;

wherein transmitting the FEC data is further responsive to the determining that the FEC data is sufficient to estimate the information for the at least one packet.

6. The medium of claim 1, wherein the operations further comprising:
transmitting, by the particular network device, a second plurality of packets without a second Forward Error Correction (FEC) data corresponding to the second plurality of packets, the FEC data comprising information to estimate information for at least one packet in the second plurality of packets using packets, other than the at least one packet, in the second plurality of packets;
determining that a subset of packets in the plurality of packets did not reach a target device;
determining that the second FEC data is sufficient to estimate the information for the subset of packets in the second plurality of packets;
responsive to determining that the second FEC data is insufficient to estimate the information for the subset of packets, refraining from transmitting the second FEC data to the target device.

7. The medium of claim 1, wherein the plurality of packets comprises packets corresponding to one of: an Intracoded frame (I-frame), bi-directionally predicted frame (B-frame), or a forward predicted frame (P-frame).

8. The medium of claim 1, wherein the operations further comprise:
prior to transmitting the plurality of packets:
determining, by the particular network device, whether to transmit the FEC data with the plurality of packets or not to transmit the FEC data with the plurality of packets based on one or more network conditions.

9. The medium of claim 8, wherein the one or more network conditions comprise one or more of: a level of traffic congestion or an amount of time without a decode error.

10. The medium of claim 1, wherein the operations further comprise:
receiving, by the particular network device, a second plurality of packets to be transmitted to the client device;
determining that one or more network conditions meet a minimum criteria;
responsive to determining that the one or more network conditions meet the minimum criteria, transmitting the second plurality of packets to the target device with a second FEC data corresponding to the second plurality of packets.

11. A system comprising: at least one device including a hardware processor; the system being configured to perform operations comprising:
transmitting, by a particular network device, a plurality of packets without Forward Error Correction (FEC) data corresponding to the plurality of packets, the FEC data comprising information to estimate information for at least one packet in the plurality of packets using packets, other than the at least one packet, in the plurality of packets;
determining that the at least one packet in the plurality of packets did not reach a target device;
responsive to determining that the at least one packet did not reach the target device, transmitting the FEC data to the target device.

12. The system of claim 11, wherein the operations further comprise:
prior to the transmitting the plurality of packets:
receiving, by the particular network device, a dataset comprising both (a) the plurality of packets and (b) the FEC data corresponding to the plurality of packets; and
identifying, by the particular network device, the plurality of packets from the dataset for transmission to the target device without the FEC data.

13. The system of claim 11, wherein the operations further comprising: generating, by the particular network device, the FEC data from the plurality of packets.

14. The system of claim 11, wherein the operations further comprising: generating, by the particular network device, the FEC data from the plurality of packets by performing an Exclusive Or (XOR) on data within the plurality of packets.

15. The system of claim 11, wherein the operations further comprise: determining that the FEC data is sufficient to estimate the information for the at least one packet; wherein transmitting the FEC data is further responsive to the determining that the FEC data is sufficient to estimate the information for the at least one packet.

16. The system of claim 11, wherein the operations further comprising:
transmitting, by the particular network device, a second plurality of packets without a second Forward Error Correction (FEC) data corresponding to the second plurality of packets, the FEC data comprising information to estimate information for at least one packet in the second plurality of packets using packets, other than the at least one packet, in the second plurality of packets;
determining that a subset of packets in the plurality of packets did not reach a target device; determining that the second FEC data is sufficient to estimate the information for the subset of packets in the second plurality of packets;
responsive to determining that the second FEC data is insufficient to estimate the information for the subset of packets, refraining from transmitting the second FEC data to the target device.

17. The system of claim 11, wherein the plurality of packets comprises packets corresponding to one of: an Intracoded frame (I-frame), bi-directionally predicted frame (B-frame), or a forward predicted frame (P-frame).

18. The system of claim 11, wherein the operations further comprise:
prior to transmitting the plurality of packets:
determining, by the particular network device, whether to transmit the FEC data with the plurality of packets or not to transmit the FEC data with the plurality of packets based on one or more network conditions.

19. The system of claim 18, wherein the one or more network conditions comprise one or more of: a level of traffic congestion or an amount of time without a decode error.

20. The system of claim 11, wherein the operations further comprise:
receiving, by the particular network device, a second plurality of packets to be transmitted to the client device;
determining that one or more network conditions meet a minimum criteria;
responsive to determining that the one or more network conditions meet the minimum criteria, transmitting the second plurality of packets to the target device with a second FEC data corresponding to the second plurality of packets.

* * * * *